(12) United States Patent
Kim

(10) Patent No.: US 10,589,733 B2
(45) Date of Patent: Mar. 17, 2020

(54) METHOD AND APPARATUS FOR CONTROLLING MHSG OF MILD HYBRID ELECTRIC VEHICLE

(71) Applicants: Hyundai Motor Company, Seoul (KR); Kia Motors Corporation, Seoul (KR)

(72) Inventor: Hyun Kim, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 38 days.

(21) Appl. No.: 15/831,291

(22) Filed: Dec. 4, 2017

(65) Prior Publication Data
US 2018/0162368 A1    Jun. 14, 2018

(30) Foreign Application Priority Data
Dec. 13, 2016 (KR) .................. 10-2016-0169480

(51) Int. Cl.
*B60W 20/40* (2016.01)
*B60W 20/30* (2016.01)
(Continued)

(52) U.S. Cl.
CPC .............. *B60W 20/30* (2013.01); *B60K 6/36* (2013.01); *B60K 6/387* (2013.01); *B60K 6/485* (2013.01); *B60K 6/547* (2013.01); *B60W 10/02* (2013.01); *B60W 10/06* (2013.01); *B60W 10/08* (2013.01); *B60W 10/115* (2013.01);
(Continued)

(58) Field of Classification Search
CPC ...... Y10T 477/26; B60K 6/485; B60K 6/387; B60W 30/18072; B60W 10/08; B60W 10/06; B60W 10/02; B60W 20/40; B60W 2550/142; B60W 2540/12; B60W 2540/10; B60W 2520/10; B60W 2510/1005;
(Continued)

(56) References Cited

U.S. PATENT DOCUMENTS 5,993,351 A * 11/1999 Deguchi ............... B60K 6/442
477/5
6,190,282 B1 * 2/2001 Deguchi ............... B60K 6/442
180/65.23
(Continued)

FOREIGN PATENT DOCUMENTS

JP    2013-018399 A    1/2013

OTHER PUBLICATIONS

English translation of JP2013018399A; http://translationportal.epo.org; Jun. 27, 2019 (Year: 2019).*

*Primary Examiner* — Roger L Pang
(74) *Attorney, Agent, or Firm* — Morgan, Lewis & Bockius LLP

(57) ABSTRACT

A method of and an apparatus for controlling MHSG of a mild hybrid electric vehicle may include: detecting data for controlling the MHSG; determining whether an entry condition of coasting is satisfied based on the data; releasing a shift clutch of a transmission when the entry condition of coasting is satisfied; determining whether a release condition of coasting is satisfied in a state in which the mild hybrid electric vehicle is coasting; determining a target speed of an engine when the release condition of coasting is satisfied; and controlling the MHSG such that a speed of the engine increases to the target speed.

15 Claims, 3 Drawing Sheets

(51) Int. Cl.
- *B60K 6/485* (2007.10)
- *B60W 20/00* (2016.01)
- *B60W 10/02* (2006.01)
- *B60W 10/08* (2006.01)
- *B60W 10/06* (2006.01)
- *B60W 30/18* (2012.01)
- *B60K 6/387* (2007.10)
- *B60K 6/36* (2007.10)
- *B60K 6/547* (2007.10)
- *B60W 10/115* (2012.01)

(52) U.S. Cl.
CPC ............ *B60W 20/00* (2013.01); *B60W 20/40* (2013.01); *B60W 30/18072* (2013.01); *B60L 2240/421* (2013.01); *B60L 2240/423* (2013.01); *B60W 2030/1809* (2013.01); *B60W 2510/1005* (2013.01); *B60W 2520/10* (2013.01); *B60W 2540/10* (2013.01); *B60W 2540/12* (2013.01); *B60W 2550/142* (2013.01); *B60W 2710/0644* (2013.01); *B60W 2710/081* (2013.01); *B60W 2710/085* (2013.01); *Y02T 10/6286* (2013.01); *Y10T 477/26* (2015.01); *Y10T 477/6805* (2015.01); *Y10T 477/6808* (2015.01)

(58) Field of Classification Search
CPC .. B60W 2030/1809; B60W 2710/0644; Y02T 10/6286

See application file for complete search history.

(56) References Cited

U.S. PATENT DOCUMENTS

| | | | |
|---|---|---|---|
| 7,509,202 B2* | 3/2009 | Scelers | F16H 59/66 477/70 |
| 7,758,467 B2 | 7/2010 | Ashizawa et al. | |
| 2009/0124450 A1* | 5/2009 | Silveri | B60K 6/442 477/5 |
| 2015/0158491 A1* | 6/2015 | Suzuki | B60W 30/18072 701/67 |

* cited by examiner

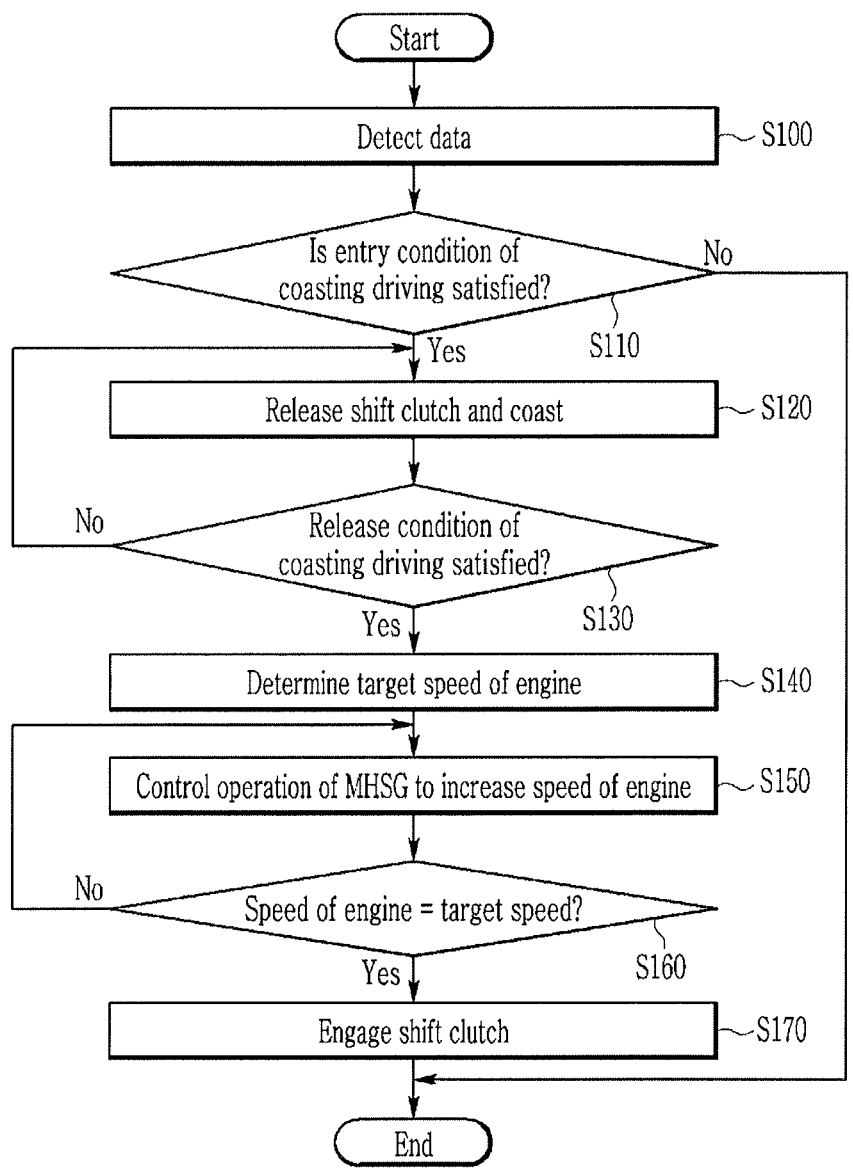

METHOD AND APPARATUS FOR CONTROLLING MHSG OF MILD HYBRID ELECTRIC VEHICLE

CROSS-REFERENCE TO RELATED APPLICATION

The present application claims priority to Korean Patent Application No. 10-2016-0169480 filed on Dec. 13, 2016, the entire contents of which is incorporated herein for all purposes by this reference.

BACKGROUND OF THE INVENTION

Field of the Invention

The present invention relates to a method of and an apparatus for controlling an MHSG of a mild hybrid electric vehicle. More particularly, the present invention relates to a method of and an apparatus for controlling a mild hybrid starter & generator (MHSG) of a mild hybrid electric vehicle that can reduce engagement shock and engagement time of a shift clutch when a release condition of coasting is satisfied.

Description of Related Art

In general a hybrid electric vehicle utilizes an internal combustion engine and a battery power source together. The hybrid electric vehicle efficiently combines torque of the internal combustion engine and a torque of a motor.

Hybrid electric vehicles may be divided into a hard type and a mild type according to a power sharing ratio between an engine and a motor. In the case of the mild type of hybrid electric vehicle (hereinafter referred to as a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The MHSG may assist torque of the engine according to running states of the vehicle, and may charge a battery (e.g., a 48 V battery) through regenerative braking. Accordingly, fuel efficiency of the mild hybrid electric vehicle may be improved.

In a state in which the mild hybrid electric vehicle is coasting, a torque transmitted from an engine to a transmission may be blocked to increase a traveling distance of the mild hybrid electric vehicle. When the coasting is released, torque of the engine may be transmitted to the transmission again. In the instant case, when a speed of the engine is not synchronized with a speed of an input shaft of the transmission, shock may be applied to the transmission. It takes a long time to synchronize the speed of the engine with the speed of the input shaft of the transmission by use of only combustion torque of the engine.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a method of and an apparatus for controlling an MHSG of a mild hybrid electric vehicle having advantages of reducing engagement shock and engagement time of shift clutch when a release condition of coasting is satisfied.

A method of controlling a mild hybrid starter & generator (MHSG) of a mild hybrid electric vehicle according to an exemplary embodiment of the present invention may include: detecting data for controlling the MHSG; determining whether an entry condition of coasting is satisfied based on the data; releasing a shift clutch of a transmission when the entry condition of coasting is satisfied; determining whether a release condition of coasting is satisfied in a state in which the mild hybrid electric vehicle is coasting; determining a target speed of an engine when the release condition of coasting is satisfied; and controlling the MHSG such that a speed of the engine increases to the target speed.

The method may further include engaging the shift clutch when the speed of the engine reaches the target speed.

Whether the entry condition of coasting is satisfied may be determined based on a position value of an accelerator pedal, a position value of a brake pedal, a speed of the mild hybrid electric vehicle, a current gear stage, and a gradient of a road.

The entry condition of coasting may be satisfied when the position value of the accelerator pedal is a first predetermined position value, the position value of the brake pedal is a second predetermined position value, the speed of the mild hybrid electric vehicle is equal to or greater than a first predetermined speed, the current gear stage is equal to or greater than a predetermined gear stage, and the gradient of the road is within a predetermined gradient range.

The releasing of the shift clutch of the transmission when the entry condition of coasting is satisfied may include stopping the engine.

The releasing of the shift clutch of the transmission when the entry condition of coasting is satisfied may include maintaining the engine in an idle state.

Whether the release condition of coasting is satisfied may be determined based on a position of an accelerator pedal, a position value of brake pedal, a speed of a mild hybrid electric vehicle, a current gear stage, and a gradient of a road.

The release condition of coasting may be satisfied when the position value of the accelerator pedal is greater than a first predetermined position value, the position value of the brake pedal is greater than the second predetermined value, the speed of the mild hybrid electric vehicle is less than the second predetermined speed, the current gear stage is less than the predetermined gear stage, or the gradient of the road is out of the predetermined gradient range.

An apparatus for controlling a mild hybrid starter & generator (MHSG) of a mild hybrid electric vehicle according to an exemplary embodiment of the present invention may include: a data detector detecting data for controlling the MHSG that starts an engine or generates electricity by an output of the engine; and a controller determining whether an entry condition of coasting based on the data, and releasing a shift clutch of a transmission when the entry condition of coasting is satisfied, wherein the controller determines whether a release condition of coasting is satisfied in a state in which the mild hybrid electric vehicle is coasting, determines a target speed of the engine when the release condition of coasting is satisfied, and controls the MHSG such that a speed of the engine increases to the target speed.

The controller may engage the shift clutch when the speed of the engine reaches the target speed.

The controller may be configured to determine whether the entry condition of coasting is satisfied based on a position value of an accelerator pedal, a position value of a brake pedal, a speed of a mild hybrid electric vehicle, a current gear stage, and a gradient of a road.

The entry condition of coasting may be satisfied when the position value of the accelerator pedal is first predetermined position value, the position value of the brake pedal is the second predetermined position value, the speed of the mild hybrid electric vehicle is equal to or greater than a first predetermined speed, a current gear stage is equal to or greater than a predetermined gear stage, and a gradient of a road is within a predetermined gradient range.

The controller may stop the engine when the entry condition of coasting is satisfied.

The controller may maintain the engine in an idle state when the entry condition of coasting is satisfied.

The controller may be configured to determine whether the release condition of coasting is satisfied based on the position value of an accelerator pedal, a position value of a brake pedal, a speed of the mild hybrid electric vehicle, a current gear stage, and a gradient of a road.

The release condition of coasting may be satisfied when the position value of the accelerator pedal is greater than the first predetermined position value, the position value of the brake pedal is greater than the second predetermined position value, the speed of the mild hybrid electric vehicle is less than the second predetermined speed, the current gear stage is less than a predetermined gear stage, or the gradient of the road is out of the predetermined gradient range.

The data detector may include: an accelerator pedal position detector configured for detecting a position value of an accelerator pedal; a brake pedal position detector configured for detecting a position value of a brake pedal; a vehicle speed detector configured for detecting a mild hybrid electric vehicle; a gear stage detector configured for detecting a current gear stage; a gradient detector configured for detecting a gradient of a road; and an engine speed detector configured for detecting a speed of the engine.

According to an exemplary embodiment of the present invention, engagement shock and engagement time may be reduced when a release condition of coasting is satisfied.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 3 is a flowchart illustrating a method for controlling an MHSG of a mild hybrid electric vehicle according to an exemplary embodiment of the present invention.

Figure 1:
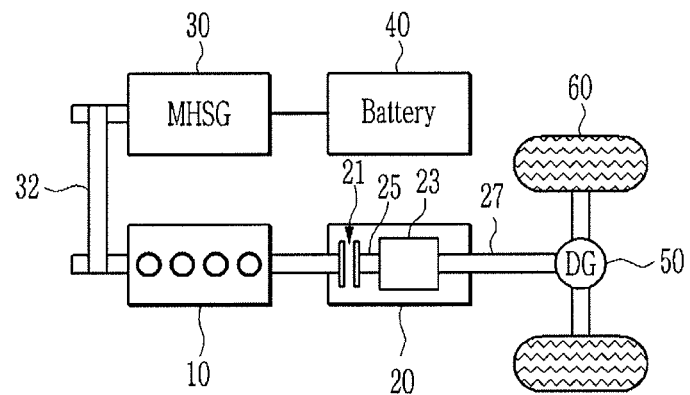
FIG. 1 is a block diagram of a mild hybrid electric vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, exemplary embodiments of the present application will be described more fully with reference to the accompanying drawings, in which exemplary embodiments of the invention are shown. However, the present invention is not limited the exemplary embodiments which are described herein, and may be modified in various different ways.

Parts which are not related with the description are omitted for clearly describing the exemplary embodiment of the present invention, and like reference numerals refer to like or similar elements throughout the specification.

Since each component in the drawings is arbitrarily illustrated for easy description, the present invention is not particularly limited to the components illustrated in the drawings.

FIG. 1 is a block diagram of a mild hybrid electric vehicle according to an exemplary embodiment of the present invention.

As shown in FIG. 1, a mild hybrid electric vehicle according to an exemplary embodiment of the present invention includes an engine 10, a transmission 20, a mild hybrid starter & generator (MHSG) 30, a battery 40, a differential gear apparatus 50, and a wheel 60.

The engine 10 combusts fuel and air to convert chemical energy into mechanical energy. Ignition timing, an air amount, a fuel amount, and an air-fuel ratio may be controlled to generate combustion torque of the engine 10.

With reference to torque transmission of a mild hybrid electric vehicle, torque generated from the engine 10 is transmitted to an input shaft 25 of the transmission 20, and a torque output from an output shaft 27 of the transmission 20 is transmitted to an axle via the differential gear apparatus 50. The axle rotates the 60 such that the mild hybrid electric vehicle runs by the torque generated from the engine 10.

The transmission 20 includes a shift clutch 21 and a gear train 23. The shift clutch 21 is disposed between the engine 10 and the gear train 23, and selectively connects the engine 10 to the gear train 23. In other words, the shift clutch 21 selectively transmits torque of engine 10 to the gear train 23. The gear train 23 changes a gear ratio according to running states of the mild hybrid electric vehicle to perform shifting to a target gear stage.

The MHSG 30 converts electrical energy into mechanical energy or converts mechanical energy into electrical energy. The MHSG 30 starts the engine 10 or generates electricity according to an output of the engine 10. In addition, the MHSG 30 may assist the torque of the engine 10. The torque of the engine 10 may be used as main torque, and a torque of the MHSG 30 may be used as auxiliary torque. The engine 10 and the MHSG 30 may be connected to each other through a belt 32.

The battery 40 may supply electricity to the MHSG 30, and may be charged through electricity recovered by the MHSG 30. The battery 40 may be a 48 V battery. The mild hybrid electric vehicle may further include a low voltage battery DC-DC converter (LDC) converting a voltage supplied from the battery 40 into a low voltage, and a low voltage battery (e.g., a 12 V battery) supplying a low voltage to electrical loads (e.g., a head lamp and an air conditioner).

Figure 2:
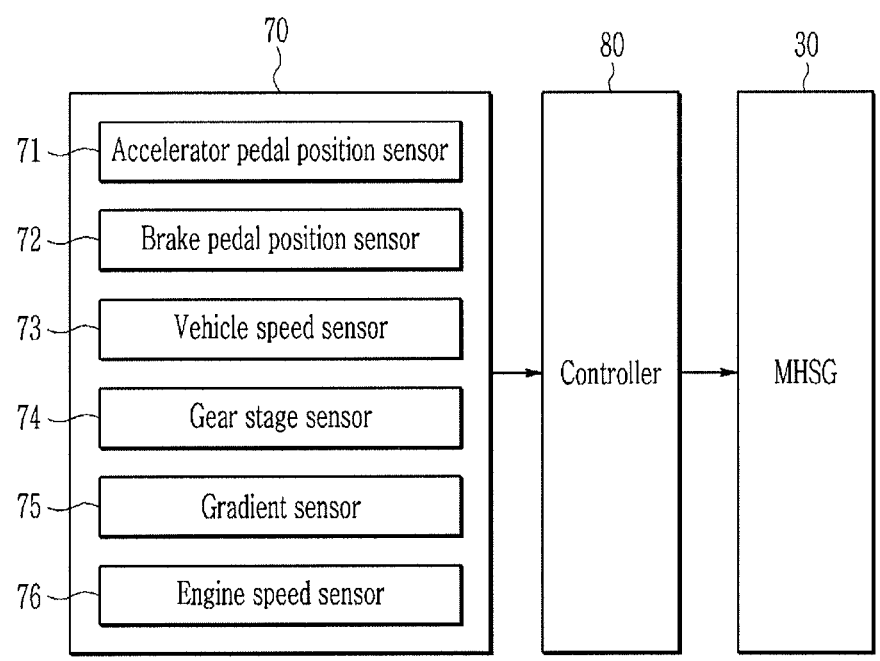
FIG. 2 is a block diagram illustrating an apparatus for controlling an MHSG of a mild hybrid electric vehicle according to an exemplary embodiment of the present invention.

FIG. 2 is a block diagram illustrating an apparatus for controlling an MHSG of a mild hybrid electric vehicle according to an exemplary embodiment of the present invention.

As shown in FIG. 3, an apparatus for controlling an MHSG of a mild hybrid electric vehicle according to an exemplary embodiment of the present invention includes a data detector 70 and a controller 80.

The data detector 70 detects data for controlling the MHSG 30, and the data detected by the data detector 70 is transmitted to the controller 80. The data detector 70 may include an accelerator pedal position detector 71, a brake pedal position detector 72, a vehicle speed detector 73, a gear stage detector 74, a gradient detector 75, and an engine speed detector 76.

The accelerator pedal position detector 71 detects a position value of an accelerator pedal (i.e., a pushed degree of the accelerator pedal), and transmits a signal corresponding thereto to the controller 80. When the accelerator pedal is pushed completely, the position value of the accelerator pedal is 100%, and when the accelerator pedal is not pushed, the position value of the accelerator pedal is 0%.

The brake pedal position detector 71 detects a position value of a brake pedal (i.e., a pushed degree of a brake pedal), and transmits a signal corresponding thereto to the controller 80. When the brake pedal is pushed completely, the position value of the brake pedal is 100%, and when the brake pedal is not pushed, the position value of the brake pedal is 0%.

The vehicle speed detector 73 detects a speed of the mild hybrid electric vehicle, and transmits a signal corresponding thereto to the controller 80.

The gear stage detector 74 detects a gear stage which is currently engaged (hereinafter, referred to as 'current gear stage'), and transmits a signal corresponding thereto to the controller 80. For example, gear stages which may be engaged may be first, second, third, fourth, fifth, sixth, seventh, and eighth gear stages, and a reverse stage, in an eight-speed transmission.

The gradient detector 75 detects a gradient of a road, and transmits a signal corresponding thereto to the controller 80.

The engine speed detector 76 detects a speed of the engine 10, and transmits a signal corresponding thereto to the controller 80.

The controller 80 controls operation of the MHSG 30 based on the data detected by the data detector 70. The controller 80 may determine whether an entry condition of coasting driving is satisfied and may determine whether an release condition of coasting driving is satisfied based on the data. The controller 80 may be implemented with one or more processors executed by a predetermined program, and the predetermined program may include a series of commands for performing each step included in a method for controlling an MHSG of a mild hybrid electric vehicle according to an exemplary embodiment of the present invention to be described below.

FIG. 3 is a flowchart illustrating a method for controlling an MHSG of a mild hybrid electric vehicle according to an exemplary embodiment of the present invention.

As shown in FIG. 3, a method for controlling an MHSG of a mild hybrid electric vehicle according to an exemplary embodiment of the present invention begins with detecting data for controlling the MHSG 30 at step S100. The accelerator pedal position detector 71 detects the position value of the accelerator pedal, the brake pedal position detector 72 detects the position value of the brake pedal, the vehicle speed detector 73 detects the speed of the mild hybrid electric vehicle, the gear stage detector 74 detects the current gear stage, and the gradient detector 75 detects the gradient of the road, and the engine speed detector 76 detects the speed of the engine 10.

The controller 80 determines whether the entry condition of coasting driving is satisfied based on the data at step S110. The controller 80 may determine whether the entry condition of coasting driving is satisfied based on the position value of the accelerator pedal, the position value of the brake pedal, the speed of the mild hybrid electric vehicle, the current gear stage, and the gradient of the road. For example, the entry condition of coasting driving may be satisfied when the position value of the accelerator pedal is a first predetermined position value (e.g., 0%), the position value of the brake pedal is a second predetermined position value (e.g., 0%), the speed of the mild hybrid electric vehicle is equal to or greater than a first predetermined speed (e.g., 30 KPH), the current gear stage is equal to or greater than a predetermined gear stage (e.g., fourth gear stage), and the gradient of the road is within a predetermined gradient range (e.g., between −4% and 4%).

When the entry condition of coasting driving is not satisfied at step S110, the controller 80 finishes the method for controlling the MHSG 30 of the mild hybrid electric vehicle according to an exemplary embodiment of the present invention.

When the entry condition of coasting driving is satisfied at step S110, the controller 80 release the shift clutch 21 at step S120. In the instant case, the controller 80 stops the engine 10 or maintains the engine 10 in an idle state. The speed of the engine 10 may be 800 RPM to 1000 RPM in the idle state. Accordingly, in a state in which connection between the engine 10 and the transmission 20 is blocked, traveling distance of the mild hybrid electric vehicle is increased according to the coasting driving, improving fuel consumption of the mild hybrid electric vehicle. In a state in which the mild hybrid vehicle is coasting, the speed of the mild hybrid electric vehicle may be decreased, and thus down-shifting may be performed. In other words, the controller 80 may change a gear ratio of the gear train 23 by use of a shift pattern map based on the position value of the accelerator pedal and the speed of the mild hybrid electric vehicle. A target gear stage corresponding to the position value of the accelerator pedal and the speed of the mild hybrid electric vehicle is set in the shift pattern map. For example, when the current gear stage is the fourth gear stage and the speed of the mild hybrid electric vehicle is decreased, shifting to the third gear stage may be performed.

In the state in which the mild hybrid electric vehicle is coasting, the controller 80 determines whether the release condition of coasting driving is satisfied at step S130. The controller 80 may determine whether the release condition of coasting is satisfied based on the position value of the accelerator pedal, the position value of the brake pedal, the speed of the mild hybrid electric vehicle, the current gear stage, and the gradient of the road. For example, the release condition of coasting may be satisfied when the position value of the accelerator pedal is greater than the first predetermined position value, the position value of the brake pedal is greater than the second predetermined position value, the speed of the mild hybrid electric vehicle is less than a second predetermined speed (e.g., 25 KPH), the current gear stage is less than the predetermined gear stage, or the gradient of the road is out of the predetermined gradient range.

When the release condition of coasting is not satisfied at step S130, coasting of the mild hybrid electric vehicle is maintained.

When the release condition of coasting is satisfied at step S130, the controller 80 determines a target speed of the engine 10 at step S140. In a state in which the shift clutch 21 is released, there is a difference between the speed of the engine 10 and a speed of an input shaft 25 of the transmission. In other words, when the shift clutch 21 is released and the engine 10 is stopped, the speed of the engine 10 may be 0 RPM, and when the engine 10 is in the idle state, the speed of the engine 10 may be 800 RPM to 1000 RPM. The speed of the input shaft 25 of the transmission 20 may be determined based on the speed of the mild hybrid electric vehicle and the gear ratio of the current gear stage. In a state in which the speed of the engine 10 is not synchronized with the speed of the input shaft 25 of the transmission 20, when the shift clutch 21 is engaged, engagement shock may occur. The target speed of the engine 10 may be determined based on the position value of the accelerator pedal and the speed of the mild hybrid electric vehicle. For example, when a driver pushes the accelerator pedal during coasting, shifting from the current gear stage to the target gear stage may be required, and the controller 80 may determine the target speed of the engine 10 that correspond to the target gear stage based on the position value of the accelerator pedal and the speed of the mild hybrid electric vehicle.

The controller 80 may control the MHSG 30 such that the speed of the engine 10 increases to the target speed at step S150. A time (e.g., about 1.2 seconds) when torque of the MHSG 30 is used to increase the speed of the engine 10 is shorter than a time (e.g., about 1.6 seconds) when combustion torque of the engine 10 is used to increase the speed of the engine 10. In other words, torque control by the MHSG 30 is faster than torque control by combustion of fuel and air in terms of responsiveness.

The controller 80 determines whether the speed of the engine 10 reaches the target speed at step S160.

When the speed of the engine 10 does not reach the target speed at step S160, the controller 80 continuously performs step S150.

When the speed of the engine 10 reaches the target speed at step S160, the controller 80 engages the shift clutch 21 at step S170. Accordingly, torque of the engine 10 may be transmitted to the transmission 20.

As described above, according to an exemplary embodiment of the present invention, engagement shock and engagement time of the shift clutch 21 may be reduced.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling a mild hybrid starter & generator (MHSG) of a mild hybrid electric vehicle, the method comprising:
    detecting data for controlling the MHSG;
    determining whether an entry condition of coasting is satisfied based on the data;
    releasing a shift clutch of a transmission when the entry condition of coasting is satisfied;
    determining whether a release condition of coasting is satisfied when the mild hybrid electric vehicle is coasting;
    determining a target speed of an engine when the release condition of coasting is satisfied; and
    controlling the MHSG such that a speed of the engine increases to the target speed,
    whether the release condition of coasting is satisfied is determined based on position value of an accelerator pedal, a position value of a brake pedal, a speed of the mild hybrid electric vehicle, a current gear stage, and a gradient of a road.

2. The method of claim 1, further including engaging the shift clutch when the speed of the engine reaches the target speed.

3. The method of claim 1, wherein whether the entry condition of coasting is satisfied is determined based on the position value of the accelerator pedal, the position value of the brake pedal, the speed of the mild hybrid electric vehicle, the current gear stage, and the gradient of the road.

4. The method of claim 3, wherein the entry condition of coasting is satisfied when the position value of the accelerator pedal is a first predetermined position value, the position value of the brake pedal is a second predetermined position value, the speed of the mild hybrid electric vehicle is equal to or greater than a first predetermined speed, the current gear stage is equal to or greater than a predetermined gear stage, and the gradient of the road is within a predetermined gradient range.

5. The method of claim 1, wherein the releasing of the shift clutch of the transmission when the entry condition of coasting is satisfied includes stopping the engine.

6. The method of claim 1, wherein the releasing of the shift clutch of the transmission when the entry condition of coasting is satisfied includes maintaining the engine in an idle state.

7. The method of claim 1, wherein the release condition of coasting is satisfied when the position value of the accelerator pedal is greater than a first predetermined position value, the position value of the brake pedal is greater than a second predetermined value, the speed of the mild hybrid electric vehicle is less than a first predetermined speed, the current gear stage is less than a predetermined gear stage, or the gradient of the road is beyond a predetermined gradient range.

8. An apparatus for controlling a mild hybrid starter & generator (MHSG) of a mild hybrid electric vehicle, the apparatus comprising:
- a data detector detecting data for controlling the MHSG that starts an engine or generates electricity by an output of the engine; and
- a controller configured for determining whether an entry condition of coasting based on the data, and releasing a shift clutch of a transmission when the entry condition of coasting is satisfied, wherein the controller is configured to determine whether a release condition of coasting is satisfied when the mild hybrid electric vehicle is coasting, is configured to determine a target speed of the engine when the release condition of coasting is satisfied, and is configured to control the MHSG such that a speed of the engine increases to the target speed,
- wherein the controller is configured to determine whether the release condition of coasting is satisfied based on a position value of an accelerator pedal, a position value of a brake pedal, a speed of the mild hybrid electric vehicle, a current gear stage, and a gradient of a road.

9. The apparatus of claim 8, wherein the controller engages the shift clutch when the speed of the engine reaches the target speed.

10. The apparatus of claim 8, wherein the controller is configured to determine whether the entry condition of coasting is satisfied based on the position value of the accelerator pedal, the position value of the brake pedal, the speed of the mild hybrid electric vehicle, the current gear stage, and gradient of the road.

11. The apparatus of claim 10, wherein the entry condition of coasting is satisfied when the position value of the accelerator pedal is a first predetermined position value, the position value of the brake pedal is a second predetermined position value, the speed of the mild hybrid electric vehicle is equal to or greater than a first predetermined speed, the current gear stage is equal to or greater than a predetermined gear stage, and the gradient of the road is within a predetermined gradient range.

12. The apparatus of claim 8, wherein the controller is configured to stop the engine when the entry condition of coasting is satisfied.

13. The apparatus of claim 8, wherein the controller is configured to maintain the engine in an idle state when the entry condition of coasting is satisfied.

14. The apparatus of claim 8, wherein the release condition of coasting is satisfied when the position value of the accelerator pedal is greater than a first predetermined position value, the position value of the brake pedal is greater than a second predetermined position value, the speed of the mild hybrid electric vehicle is less than a second predetermined speed, the current gear stage is less than a predetermined gear stage, or the gradient of the road is beyond a predetermined gradient range.

15. The apparatus of claim 8, wherein the data detector includes:
- an accelerator pedal position detector configured for detecting the position value of the accelerator pedal;
- a brake pedal position detector configured for detecting the position value of the brake pedal;
- a vehicle speed detector configured for detecting the mild hybrid electric vehicle;
- a gear stage detector configured for detecting the current gear stage;
- a gradient detector configured for detecting the gradient of the road; and
- an engine speed detector configured for detecting the speed of the engine.

\* \* \* \* \*